United States Patent [19]

Nakaya et al.

[11] Patent Number: 4,695,445
[45] Date of Patent: Sep. 22, 1987

[54] MAGNESIUM HYDROXIDE AND PROCESS FOR ITS PRODUCTION

[75] Inventors: Keiichi Nakaya, Chiba; Kunio Tanaka, Ichihara, both of Japan

[73] Assignee: Asahi Glass Company Ltd., Tokyo, Japan

[21] Appl. No.: 895,464

[22] Filed: Aug. 11, 1986

[30] Foreign Application Priority Data

Aug. 14, 1985 [JP] Japan ............................. 60-177713

[51] Int. Cl.$^4$ .............................................. C01F 5/16
[52] U.S. Cl. ................................. 423/635; 423/636; 423/638; 423/639
[58] Field of Search ................ 423/635, 636, 638, 639

[56] References Cited

U.S. PATENT DOCUMENTS

| | | | |
|---|---|---|---|
| 1,348,988 | 8/1926 | Dolbear | 423/636 |
| 1,986,509 | 1/1935 | MacIntire | 423/636 |
| 3,508,869 | 4/1970 | Shoaff | 423/639 |
| 3,711,600 | 1/1973 | Sturm et al. | 423/639 |

FOREIGN PATENT DOCUMENTS

| | | | |
|---|---|---|---|
| 403860 | 1/1934 | United Kingdom | 423/638 |
| 693108 | 6/1953 | United Kingdom | 423/636 |
| 939467 | 10/1963 | United Kingdom | 423/639 |
| 967954 | 3/1980 | U.S.S.R. | 423/639 |

*Primary Examiner*—John Doll
*Assistant Examiner*—Wayne A. Langel
*Attorney, Agent, or Firm*—Oblon, Fisher, Spivak, McClelland & Maier

[57] ABSTRACT

Magnesium hydroxide of a fine plate-like particle form having an average particle size ($\bar{d}$) of from 0.2 to 0.8 $\mu$m as measured by a light transmission type liquid phase sedimentation method, wherein the proportion of particles having a particle size of $\bar{d}+0.5$ $\mu$m or larger is not higher than 50% by weight based on the weight of the total particles, and the particle thickness distribution is such that the proportion of particles having a thickness of 0.05 $\mu$m or less is not higher than 5% by number and the proportion of particles having a thickness of 0.2 $\mu$m or more is not higher than 20% by number.

20 Claims, 4 Drawing Figures

X10000

X 10000

X10000

MAGNESIUM HYDROXIDE AND PROCESS FOR ITS PRODUCTION

The present invention relates to magnesium hydroxide of a fine plate-like crystal form, and a process for its production. More particularly, it relates to fine particulate magnesium hydroxide having excellent dispersibility and anti-agglomeration properties and thus being useful as a fire retardant filler for a thermoplastic resin.

Heretofore, as magnesium hydroxide obtainable by reacting a solution containing a magnesium salt with ammonia, Japanese Unexamined Patent Publication No. 83952/1979 discloses a product having a BET specific surface area of not higher than 20 m²/g and a BET specific surface area/Brane method specific surface area ratio of from about 1 to about 3, as a fire retardant filler for a thermoplastic resin, and it discloses that for the production of such magnesium hydroxide, the process disclosed in Japanese Unexamined Patent Publication No. 115799/1977 can be employed. The process disclosed in Japanese Unexamined Patent Publication No. 115799/1977 comprises heating basic magnesium chloride or nitrate in an aqueous medium under a pressurized condition. However, this process has drawbacks that it requires an expensive installation and a cumbersome operation including the heating under a pressurized condition. Further, the magnesium hydroxide obtained by the disclosed process is not necessarily satisfactory from the viewpoint of incorporation into a resin, and no crystal form is disclosed although the magnesium hydroxide is disclosed to have a small crystal distortion.

Further, the present applicants have previously proposed in Japanese Patent Application No. 7049/1984 to catalytically react ammonia with an aqueous solution containing a magnesium salt by instantaneous mixing free from back mixing, to obtain highly pure magnesium hydroxide crystals as fine as submicrometers. However, it has been found that this magnesium hydroxide has a difficulty that it is likely to agglomerate in the solution.

Accordingly, it is an object of the present invention to provide magnesium hydroxide having a fine, thin and relatively uniform particle form.

Another object of the present invention is to provide a convenient means for the production of magnesium hydroxide of a fine plate-like particle form having minimum agglomeration properties, without necessity to employ a cumbersome method as disclosed in Japanese Unexamined Patent Publication No. 115799/1977.

The present invention provides magnesium hydroxide of a fine plate-like particle form having an average particle size ($\bar{d}$) of from 0.2 to 0.8 μm as measured by a light transmission type liquid phase sedimentation method, wherein the proportion of particles having a particle size of $\bar{d}+0.5$ μm or larger is not higher than 50% by weight based on the weight of the total particles, and the particle thickness distribution is such that the proportion of particles having a thickness of 0.05 μm or less is not higher than 5% by number and the proportion of particles having a thickness of 0.2 μm or more is not higher than 20% by number.

Further, the present invention provides a process for producing magnesium hydroxide which comprises reacting an aqueous solution containing a water soluble magnesium salt, with ammonia and precipitating formed magnesium hydroxide from the aqueous solution, wherein the precipitation of magnesium hydroxide is initiated when the concentration of magnesium hydroxide dissolved in the aqueous solution reaches a level equal to or higher than $C_S$ represented by the following formula:

$$C_S = 0.0293\, C_M^{1.78}$$

where $C_S$ is the concentration (g mol/liter) of magnesium hydroxide dissolved in the aqueous solution at the initiation of the precipitation of magnesium hydroxide, and $C_M$ is the concentration (g mol/liter) of magnesium ions in the aqueous solution containing the water soluble magnesium salt to be reacted with ammonia, so as to obtain magnesium hydroxide having the above-mentioned characteristics.

Now, the present invention will be described in detail with reference to the preferred embodiments.

In the accompanying drawings.

As mentioned above, the magnesium hydroxide of the present invention is very fine and plate-like and has a uniform particle size distribution and thickness distribution. The fine plate-like structure of the magnesium hydroxide of the present invention is evident from FIGS. 1 and 2 showing the electron microscopic plan view and side view, respectively, of particles of the magnesium hydroxide of the present invention.

Figure 3:
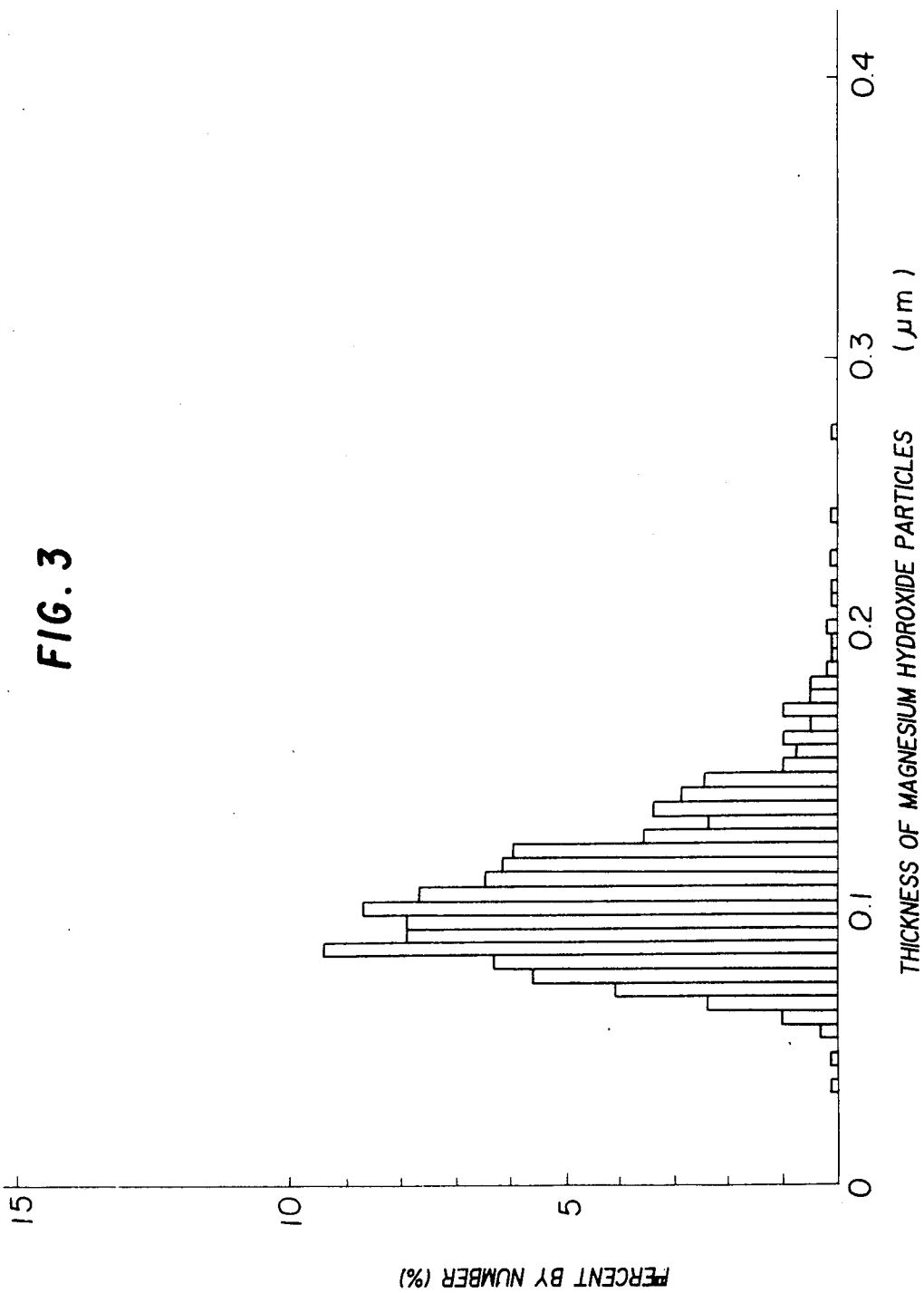
FIG. 3 is a graph showing the thickness distribution curve of the magnesium hydroxide of the present invention shown in FIG. 1.

FIG. 3 shows the thickness distribution curve of the magnesium hydroxide particles of the present invention. The thickness distribution curve was obtained by the following method.

A magnesium hydroxide sample was kneaded with a resin such as a polyethylene resin, and the mixture was molded into a sheet so that magnesium hydroxide crystals were oriented in a certain direction in the sheet. Then, the resin sheet having the magnesium hydroxide incorporated therein, was subjected to rupture under a frozen state, and the resin at the ruptured cross-section was removed by oxygen plasma treatment at a low temperature. A photograph of the remaining magnesium hydroxide crystals was taken by an electron microscope. Then, the thickness of magnesium hydroxide was measured, and a distribution curve of the thickness was prepared.

Figure 1:
FIG. 1 is an electron microscopic photograph showing the plan view of particles of magnesium hydroxide of the present invention.
Figure 2:
FIG. 2 is an electron microscopic photograph showing the side view of the same particles.

As is evident from FIGS. 1 to 3, the magnesium hydroxide of the present invention has a thin plate-like form and the thickness distribution is highly uniform.

Figure 4:
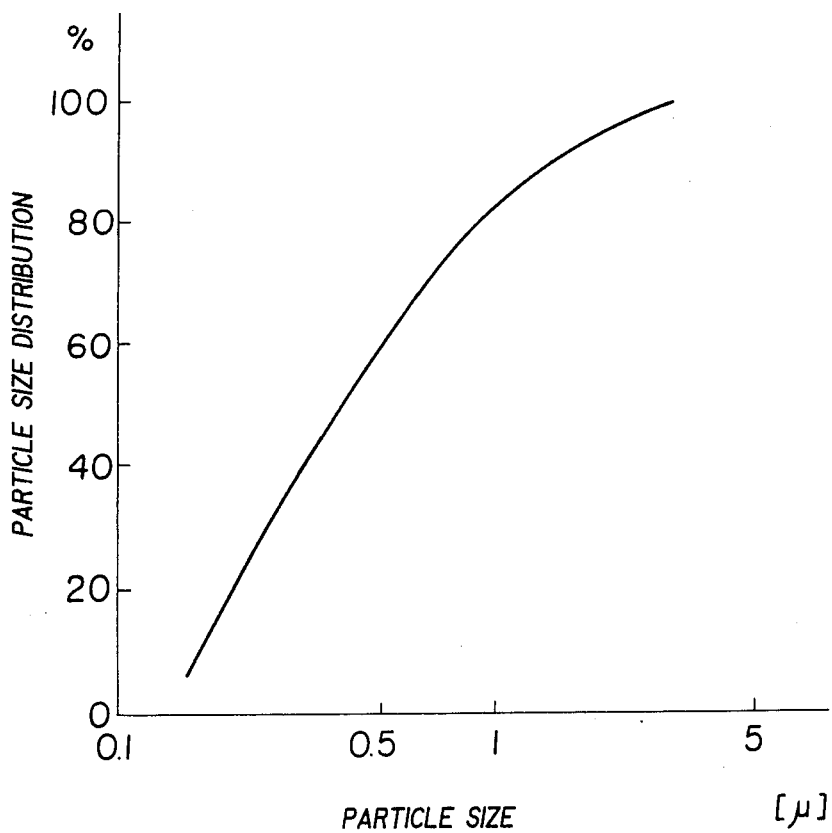
FIG. 4 is a graph showing the particle size distribution curve of the magnesium hydroxide of the present invention, as obtained by a light transmission type liquid phase sedimentation method.

Further, FIG. 4 shows a distribution curve of the particle size of the magnesium hydroxide of the present invention, as measured by a light transmission type liquid phase sedimentation method. From this particle size distribution curve, it is evident that the magnesium hydroxide of the present invention is very fine and has a uniform particle size distribution.

The light transmission type liquid phase sedimentation method used as a method for measuring the particle size distribution in the present invention, is as follows.

A sample is suspended in a medium such as distilled water or an aqueous ethanol solution, whereupon the sedimentation of particles in the liquid phase is measured by a light transmission method, and the particle size distribution is determined.

The plate-like shape of the magnesium hydroxide of the present invention does not present the apparent hexagonal plate configuration specific to ordinary magnesium hydroxide crystals, and the periphery of each particle has a non-specific configuration with no straight portion. The non-specific configuration of the magnesium hydroxide of the present invention is evident also from the photograph of FIG. 1.

Now, a preferred method for the production of the above-mentioned magnesium hydroxide of the present invention will be described.

The process disclosed in above-mentioned Japanese Patent Application No. 7049/1984 provides an excellent means. However, because of the instantaneous mixing without back mixing, the precipitation of magnesium hydroxide takes place before the formed magnesium hydroxide establishes an adequate super saturation degree, whereby precipitates having relatively large particle sizes are formed, although they are referred to as fine particles, and agglomeration of the magnesium hydroxide is likely to take place during the process till the completion of the reaction of the water soluble magnesium salt with ammonia.

Whereas, in the process of the present invention, the precipitation of magnesium hydroxide is delayed until the concentration of magnesium hydroxide dissolved in the solution reaches a certain level, and then substantial magnesium hydroxide crystals are precipitated all at once, whereby very fine magnesium hydroxide crystals having a uniform size will be obtained in a large amount. Further, when the subsequent reaction is continued under stirring, crystal growth proceeds with the fine magnesium hydroxide crystals serving as seed crystals without agglomeration of the fine magnesium hydroxide crystals, such being desirable from the viewpoint of the production efficiency.

In the present invention, the concentration of magnesium hydroxide dissolved in the solution of the reaction system at the initiation of the precipitation of magnesium hydroxide, is important. The reaction of the present invention can be conducted in two ways i.e. a case wherein ammonia is supplied to the aqueous solution containing the water soluble magnesium salt, and a case wherein the aqueous solution containing the water soluble magnesium salt is supplied to aqueous ammonia. Here, the concentration of magnesium hydroxide dissolved in the solution of the reaction system is meant for the concentration obtained by converting the concentration of magnesium or hydroxyl groups dissolved in the solvent, whichever is smaller, to the concentration of magnesium hydroxide. In the first method of the above-mentioned two methods, the concentration of dissolved magnesium hydroxide is obtained by measuring the hydroxyl group concentration in the solution from the amount of ammonia supplied, and converting the hydroxyl group concentration to the magnesium hydroxide concentration. In the second method, the dissolved magnesium hydroxide concentration is determined by measuring the magnesium concentration in the solution from the amount of the water soluble magnesium salt supplied, and converting the magnesium concentration to the magnesium hydroxide concentration.

In the present invention, crystals formed at the initiation of the precipitation may not necessarily be solely of magnesium hydroxide and may possibly include crystals of other magnesium salts. However, crystals of such other magnesium salts will eventually be converted to magnesium hydroxide crystals.

If the precipitation of magnesium hydroxide takes place when the dissolved concentration $C_S$ of magnesium hydroxide is less than $0.0293\ C_M^{1.78}$ g mol/liter, the number of magnesium hydroxide crystals tends to be small. Accordingly, during the subsequent crystal growth, crystals grow to be too large, such being undesirable.

In the present invention, there is no particular restriction as to the manner for initiating the precipitation of magnesium hydroxide when the dissolved magnesium hydroxide concentration reaches a level equal to or higher than $0.0293\ C_M^{1.78}$ g mol/liter. However, in a preferred embodiment, the aqueous solution containing the water soluble magnesium salt is a clear solution containing no solid component. This means not only that the aqueous solution supplied to the reactor is clear, but also that no solid impurities enter into the aqueous solution, for instance, from the wall of the reactor.

Further, in order to maintain the dissolved magnesium hydroxide concentration to the above-mentioned level, it is desired that the stirring of the aqueous solution is conducted as mild as possible. For this purpose, preferred is a method wherein the supply of ammonia at the initial stage is kept low, or a method wherein ammonia is supplied at a small linear velocity uniformly over the entire reactor through a number of fine perforations at the bottom of the reactor. Likewise, when an aqueous solution containing the water soluble magnesium salt is supplied to aqueous ammonia, it is preferred to minimize the amount of supply of this solution or to supply the solution at a small linear velocity uniformly over the entire reactor through a number of fine perforations.

Further, depending upon the manner of supplying ammonia, the magnesium ion concentration in the aqueous solution containing the water soluble magnesium salt is also an important factor. Namely, it is preferred that the magnesium ion concentration itself is at least a certain level. The magnesium ion concentration in the solution containing the water soluble magnesium salt may be less than the saturation concentration, but if the magnesium ion concentration is too low, such being undesirable from the viewpoint of the production efficiency. Therefore, the magnesium ion concentration $C_m$ in the aqueous solution containing the water soluble magnesium salt is preferably at least 0.1 g mol/liter, more preferably at least 0.5 g mol/liter.

The reaction temperature is preferably from 20° to 80° C.

In the present invention, the condition for the continuous reaction after the initiation of the precipitation of magnesium hydroxide is also important. Namely, even if a large amount of fine magnesium hydroxide crystals is formed by controlling as mentioned above, if the subsequent reaction is continued in a stand-still condition, the fine magnesium hydroxide crystals tend to agglomerate and freshly precipitated magnesium hydroxide crystals tend to accumulate thereon, eventually leading to large crystals. Therefore, the subsequent continuous reaction is preferably conducted while stirring the slurry containing the formed fine magnesium hydroxide particles. This stirring may be conducted in any optional manner, for instance, by supersonic vibration, by foaming or liquid phase stirring by supplying a large amount of ammonia or the aqueous solution containing the water soluble magnesium salt, or by stirring with an impeller. The stirring is preferably continued until the supply of ammonia or of the aqueous solution containing the water soluble magnesium salt is terminated.

Further, in the present invention, it is preferred that the stirring of the slurry containing magnesium hydroxide precipitates, is continued for at least 30 minutes after the termination of the supply of ammonia or the aqueous solution. The reason is that during the stirring, aging proceeds so that it is possible to obtain magnesium hydroxide crystals with surface having small agglomeration properties (i.e. having a low surface activity).

The magnesium hydroxide crystals thus obtained, are fine plate-like crystals having substantially uniform particle size and thickness. They have a stable surface condition with low surface activity, as mentioned above, and they have good dispersibility and non-agglomeration properties, as a filler to be incorporated into a thermoplastic resin.

Now, the present invention will be described in further detail with reference to Examples. However, it should be understood that the present invention is by no means restricted by these specific Examples.

EXAMPLE 1

One kg of a clear aqueous magnesium chloride solution having a magnesium ion concentration of 1.81 g mol/liter and containing no solid component was charged to a thoroughly washed reactor equipped with a stirrer. Ammonia gas was blown into the solution at a rate of 49 kg/hr per 1 $m^3$ of the solution through a nozzle while mildly stirring at a temperature of 40° C. When 0.227 g mol of ammonia was blown into the solution relative to 1 g mol of the magnesium ion, crystals started to precipitate, and the aqueous solution started to have white turbidity. The dissolved magnesium hydroxide concentration at that time was 0.21 g mol/liter. The precipitated crystals at that time were plate-like particles having an average particle size of 0.3 μm. Then, the ammonia gas was continuously blown under stirring, and the reaction was completed by supplying ammonia in the total amount of 3.6 g mol per 1 g mol of magnesium chloride as the starting material. After the completion of the reaction, the stirring of the slurry was continued for further 4 hours. The magnesium hydroxide slurry thus obtained, was observed by an optical microscope, whereby no agglomeration was observed. The magnesium hydroxide was filtered, dried and observed by an electron microscope, whereby it was found to be plate-like particles having a particle size of from 0.1 to 1.5μm as shown in FIGS. 1 and 2. This magnesium hydroxide was subjected to the measurement by a light transmission type liquid phase sedimentation method, whereby the particle size distribution as shown in FIG. 4 was obtained. The average particle size was 0.4 μm. The proportion of particles having a particle size of 0.9 μm or larger was 20%. The particle thickness distribution was such that the proportion of particles having a thickness of 0.05 μm or less was 0.5% by number, and the proportion of particles having a thickness of 0.2 μm or more was 1%. The BET specific surface area was 11 $m^2/g$. The magnesium hydroxide was suitable as a fire retardant filler for a thermoplastic resin.

EXAMPLES 2 to 5

Magnesium hydroxide was formed in the same manner as in Example 1 except that the magnesium chloride concentration in Example 1 was varied as shown in Table 1. Table 1 further shows the dissolved magnesium hydroxide concentration at the initiation of the precipitation of magnesium hydroxide and the physical characteristics of magnesium hydroxide thereby obtained. These magnesium hydroxide particles were similar to those shown in FIGS. 1 and 2, and they were suitable for use as a fire retardant filler.

TABLE 1

|  | Example 2 | Example 3 | Example 4 | Example 5 |
|---|---|---|---|---|
| Magnesium ion concentration in the aqueous magnesium chloride solution (g mol/liter) | 0.55 | 1.16 | 2.52 | 4.10 |
| Dissolved magnesium hydroxide concentration at the initiation of the precipitation of magnesium hydroxide (g mol/liter) | 0.025 | 0.09 | 0.37 | 0.88 |
| Range of the particle size of magnesium hydroxide (μm) | 0.1–1.5 | 0.1–1.5 | 0.1–1.5 | 0.1–1.5 |
| Shape of magnesium hydroxide | Fine plate-like particles | | | |
| Average particle size of magnesium hydroxide (μm) | 0.3 | 0.4 | 0.5 | 0.3 |
| Proportion of magnesium hydroxide particles having a particle size of d + 0.5 μm or larger (wt. %) | 26 | 13 | 21 | 16 |
| Proportion of magnesium hydroxide particles having a thickness of 0.05 μm or less (% by number) | 0.5 | 0.5 | 0.4 | 0.5 |
| Proportion of magnesium hydroxide particles having a thickness of 0.2 μm or more (% by number) | 1 | 1 | 1.5 | 1 |
| BET specific surface area ($m^2/g$) | 12 | 11 | 10 | 11 |

COMPARATIVE EXAMPLE 1

Ammonia was supplied to 1 kg of an aqueous magnesium chloride solution having a concentration of 1.81 g mol/liter in the same manner as in Example 1, and when the dissolved magnesium hydroxide concentration in the solution reached 0.05 g mol/liter, 5 g of magnesium hydroxide particles having an average particle size of 0.5 μm were added as seed crystals, whereupon the solution immediately turned to have white turbidity. The subsequent operation was conducted in the same manner as in Example 1 to form magnesium hydroxide. The various properties of the magnesium hydroxide thereby obtained, are as shown in Table 2. In this Comparative Example, the dissolved magnesium hydroxide concentration when the solution turned to have white turbidity, was almost zero.

TABLE 2

|  | Comparative Example 1 |
|---|---|
| Range of the particle size of magnesium hydroxide (μm) | 0.1–4 |
| Average particle size of magnesium hydroxide (μm) | 0.6 |
| Proportion of magnesium hydroxide particles having a particle size of d + 0.5 μm or larger (wt. %) | 20 |
| Proportion of magnesium hydroxide particles having | 0 |

TABLE 2-continued

| | Comparative Example 1 |
|---|---|
| a thickness of 0.05 μm or less (% by number) | |
| Proportion of magnesium hydroxide particles having a thickness of 0.2 μm or more (% by number) | 62 |
| BET specific surface area (m²/g) | 7 |
| Shape of magnesium hydroxide | Hexagonal plate-like |

We claim:

1. Magnesium hydroxide having a fine plate-shaped particle form with an average particle size ($\bar{d}$) of from 0.2 to 0.8 ? m as measured by a light transmission liquid phase sedimentation method, wherein the proportion of particles having a particle size of $\bar{d}+0.5$ μm or larger is not greater than 50% by weight based on the weight of the total particles, and the particle thickness distribution is such that the proportion of particles having a thickness of 0.05 μm or less is not greater than 5% by number and the proportion of particles having a thickness of 0.2 μm or more is not greater than 20% by number; and wherein said magnesium hydroxide is produced by a process which comprises:
   (a) reacting an aqueous solution containing a water-soluble magnesium salt, with ammonia; and
   (b) precipitating the magnesium hydroxide formed thereby from the aqueous solution, wherein the precipitation of magnesium hydroxide is initiated when the concentration of magnesium hydroxide dissolved in the aqueous solution reaches a level equal to or greater than the value of $C_s$, with $C_S$ being represented by the formula:

$$C_S = 0.0293 \, C_M^{1.78}$$

wherein $C_S$ is the concentration in g mol/liter of magnesium hydroxide dissolved in the aqueous solution at the initiation of the precipitation of magnesium hydroxide, and $C_M$ is the concentration in g mol/liter of magnesium ions in the aqueous solution containing the water-soluble magnesium salt to be reacted with ammonia.

2. The magnesium hydroxide produced in accordance with claim 1, wherein the water-soluble magnesium salt is selected from the group consisting of magnesium chloride, magnesium nitrate and magnesium sulfate.

3. The magnesium hydroxide produced in accordance with claim 1, wherein the magnesium ion concentration $C_m$ in the aqueous solution containing the water-soluble magnesium salt is at least 0.1 g mol/liter.

4. The magnesium hydroxide produced in accordance with claim 1, wherein the reaction for the formation of magnesium hydroxide is continued by further supplying ammonia while stirring the slurry containing precipitated magnesium hydroxide.

5. The magnesium hydroxide produced in accordance with claim 4, wherein the stirring of the slurry containing the precipated magnesium hydroxide is continued for at least 30 minutes after finally terminating the supply of ammonia.

6. The magnesium hydroxide produced in accordance with claim 1, wherein the reaction of the aqueous solution containing the water-soluble magnesium salt with ammonia is conducted by supplying ammonia to the aqueous solution.

7. The magnesium hydroxide produced in accordance with claim 1, wherein the reaction is conducted at a temperature of from 20° to 80° C.

8. The magnesium hydroxide produced in accordance with claim 1, wherein the aqueous solution containing the water-soluble magnesium salt is a clear solution containing no solid component.

9. The magnesium hydroxide produced in accordance with claim 1, wherein said reaction is effected either by adding the ammonia to the aqueous solution of water-soluble magnesium salt, or by adding the aqueous solution of water-soluble magnesium salt to ammonia.

10. The magnesium hydroxide produced in accordance with claim 1, wherein the concentration of magnesium hydroxide dissolved in the reaction solution is obtained by converting the concentration of magnesium or hydroxyl groups dissolved in the solvent, whichever is smaller, to the concentration of magnesium hydroxide.

11. The magnesium hydroxide produced in accordance with claim 10, wherein when said reaction is effected by adding ammonia to said aqueous solution of water-soluble magnesium salt, the concentration of dissolved magnesium hydroxide is obtained by measuring the hydroxyl group concentration in the solution from the amount of ammonia supplied, and converting the hydroxyl group concentration to the magnesium hydroxide concentration.

12. The magnesium hydroxide produced in accordance with claim 10, wherein when said reaction is effected by adding said aqueous solution of water-soluble magnesium salt to said ammonia, the concentration of dissolved magnesium hydroxide is determined by measuring the magnesium concentration in the solution from the amount of water-soluble magnesium salt supplied, and converting the magnesium concentration to the magnesium hydroxide concentration.

13. The magnesium hydroxide produced in accordance with claim 3, wherein the magnesium ion concentration $C_m$ in the aqueous solution containing the water-soluble magnesium salt is at least 0.5 g mol/liter.

14. The magnesium hydroxide produced in accordance with claim 1, wherein the magnesium ion concentration in the aqueous solution of magnesium salt is in the range of 0.55 to 4.10 g mol/liter.

15. The magnesium hydroxide produced in accordance with claim 1, wherein the dissolved magnesium hydroxide concentration at the initiation of the precipitation of magnesium hydroxide is in the range of 0.025 to 0.88 g mol/liter.

16. The magnesium hydroxide produced in accordance with claim 1, wherein said magnesium hydroxide has a particle size in the range of 0.1-1.5 ? m.

17. The magnesium hydroxide produced in accordance with claim 1, wherein said magnesium hydroxide has an average particle size (d) in the range of 0.3-0.5 ? m.

18. The magnesium hydroxide produced in accordance with claim 1, wherein said magnesium hydroxide has about 13-26 wt. % of particles having a particle size of $\bar{d}+0.5$ μm or larger.

19. The magnesium hydroxide produced in accordance with claim 1, wherein said magnesium hydroxide has about 0.4-0.5% by number of particles having a thickness of 0.05 μm or less, and about 1-1.5% by number of particles having a thickness of 0.2μm or more.

20. The magnesium hydroxide produced in accordance with claim 1, wherein said magnesium hydroxide comprises particles having a BET specific surface area of about 10-12 m²/g.

* * * * *